United States Patent [19]

Urano et al.

[11] 4,081,807
[45] Mar. 28, 1978

[54] REFLEX MIRROR FOR SINGLE LENS REFLEX CAMERA

[75] Inventors: Fumio Urano, Omiya; Akihiro Arai, Tokyo, both of Japan

[73] Assignee: Asahi Kogaku Kogyo Kabushiki Kaisha, Tokyo, Japan

[21] Appl. No.: 759,149

[22] Filed: Jan. 13, 1977

[30] Foreign Application Priority Data

Jan. 14, 1976 Japan .................................. 51-3041[U]

[51] Int. Cl.² .............................................. G03B 19/12
[52] U.S. Cl. .................................... 354/152; 350/171; 354/55; 354/201; 354/224
[58] Field of Search ............... 354/152, 155, 53–55, 354/200, 201, 224, 219, 225; 350/169, 171

[56] References Cited

U.S. PATENT DOCUMENTS 3,093,044  6/1963  Lederer .................................. 354/55

FOREIGN PATENT DOCUMENTS 1,208,621  1/1966  Germany .............................. 354/155

*Primary Examiner*—John Gonzales
*Attorney, Agent, or Firm*—Sughrue, Rothwell, Mion, Zinn and Macpeak

[57] ABSTRACT

A reflex mirror 2, 2' for an SLR camera includes a fully reflective, elliptical area 2a, 2a' whose center coincides with the optical axis, and a surrounding, elliptical, semi-transparent area 2b, 2b'. The remaining area 2c, 2c' of the mirror is fully reflective. The semi-transparent area may be uniform in transmissivity, or it may be formed by a plurality of concentric elliptical slits in the reflective surface.

3 Claims, 4 Drawing Figures

REFLEX MIRROR FOR SINGLE LENS REFLEX CAMERA

BACKGROUND OF THE INVENTION

This invention relates to a reflex mirror for a single lens reflex (SLR) camera.

A conventional SLR camera has a reflex mirror which is raised up out of the photographic optical path when photographing an object, and which is lowered to direct light from the lens into a viewfinder/rangefinder (v/r) optical system for framing the object and focusing the camera. A variety of such reflex mirrors are well known in the art in which part of the mirror is semi-transparent, and light passing therethrough is utilized for light measurement in a built-in metering and control system.

Since the v/r optical system should appear as bright as possible during viewing, the peripheral areas of the mirror are totally reflective to thereby maximize the quantity of light delivered to the v/r optical system. The border lines between the totally reflective areas and the semi-transparent area and/or the semi-transparent area itself are typically formed by fine, closely spaced linear slits which form a shadow on the v/r optical system, thereby degrading the viewing conditions.

The v/r optical system usually also includes a distance measuring and focusing area (such as a micro-prism and a split image) comprising a plurality of prisms in a circular region whose center coincides with the optical axis, and the viewing brightness of this region is therefore very critical. The prior art reflex mirror arrangements, however, almost invariably attenuate the light in this critical circular region.

SUMMARY OF THE INVENTION

Briefly, and in accordance with the present invention, these drawbacks and disadvantages attendant with the prior art are effectively overcome by providing a reflex mirror having a fully reflective, elliptical area whose center is coincident with the optical axis, and a partially reflective or semi-transparent area surrounding the central area and also elliptical in shape, the remaining areas of the mirror being fully reflective.

DETAILED DESCRIPTION OF THE PREFERRED EMBODIMENTS

Figure 1:
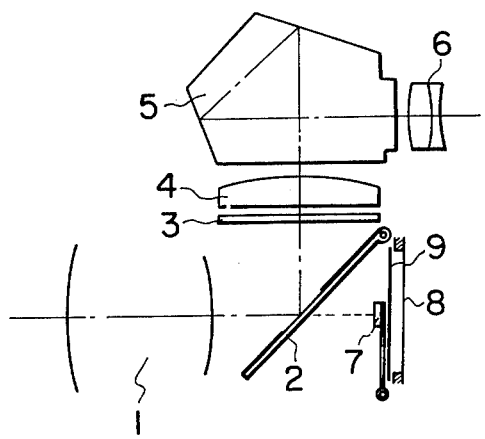
FIG. 1 shows a sectional view of a conventional SLR camera taken along its optical axis, for describing the overall arrangement of the invention.

Referring now to the drawings, in the conventional SLR camera shown in FIG. 1, light from a photographic lens system 1 is reflected by a lowered reflex mirror 2 into a v/r optical system including a focal plate 3, a condenser lens 4, a penta-prism 5, and an occular lens 6. The part of the light passing through the semi-transparent section of the mirror is sensed by a photodetector 7 incorporated in the camera metering system. Reference numerals 8 and 9 designate a film and a shutter curtain, respectively.

Figure 2:
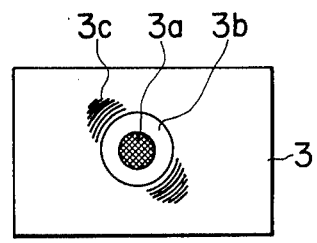
FIG. 2 shows a conventional focal plate for a SLR camera.

An observation image is formed on the focal plate 3 in a SLR camera. The conventional focal plate shown in FIG. 2 has at least two minute prisms in a small circle 3a whose center coincides with the optical axis for implementing distance measurement and focusing. The brightness of this circular area is thus particularly essential to accurate focusing and distance measurement.

Regions 3b and 3c surrounding the small circle 3a have frosted surfaces, and are utilized for supplementary distance measurement and image formation. In addition, Fresnel lenses in the form of concentric circles whose centers coincide with the optical axis are provided in the region 3c to supplement the function of the condenser lens. In some SLR cameras the minute prisms and frosted surfaces are provided on the surface of the condenser lens 4 facing the focal plate 3, but the technical concept and functioning is the same.

Figure 3:
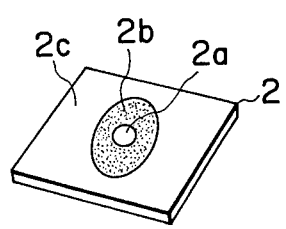
FIGS. 3 and 4 show different embodiments of a reflex mirror for a SLR camera according to the present invention.
Figure 4:
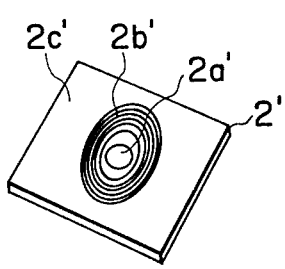

In the reflex mirror 2 or 2' according to this invention, as shown in FIGS. 3 and 4, respectively, the elliptical area 2a or 2a' corresponding to the small central circle 3a of the focal plate 3 is made totally reflective. An elliptical, semi-transparent area 2b or 2b' surrounds the area 2a or 2a' for implementing the photodetection and metering functions, and the semi-transparent area 2b or 2b' is in turn surrounded by a totally reflective, remaining area 2c or 2c'. In the embodiment of FIG. 3 the area 2b is uniformly semi-transparent; in the embodiment of FIG. 4 a plurality of light transmitting slits are provided in the form of concentric ellipses so that when an image is formed on the focal plate 3, concentric circles centered about the optical axis are formed.

The fully reflective central area 2a or 2a' of the reflex mirror 2 achieves maximum brightness in the distance measurement and focusing region 3a of the focal plate 3, which enhances the accuracy of such measurement and focusing. Furthermore, since the semi-transparent area 2b or 2b' provides a somewhat darkened image, in the form of concentric circles or the like on the focal plate 3, and since such image overlaps with the circles of the Fresnal lens, the viewing conditions are not unduly affected even in combination with the frosted surface areas of the focal plate.

In addition, since the totally reflective area 2a or 2a' is relatively small, and it is positioned sufficiently remote from the image formation plane, the quantity of light transmitted through the mirror to the photodetector is affected to only a very minor degree.

Two embodiments of the semi-transparent area have been described; the same effect can be obtained, however, by any semi-transparent area having a totally reflective central region surrounded by concentric elliptical elements providing a hazy or darkened image together with the concentric circles of the Fresnel lenses. The uniform semi-transparent area of FIG. 3 can sometimes make the border line somewhat unclear in the viewing field. On the other hand, a mirror embodying the concentric elliptical slits of FIG. 4 can be manufactured at a relatively low cost, and the transmission to reflection area ration can be freely selected. In addition, the transmission to reflection ratio can be varied by appropriately selecting the width and interval of the slits, to thereby smoothen the distribution of the transmitted light and the brightness distribution on the focal plate, thus improving the viewing conditions.

What is claimed is:

1. In a reflex mirror for a single lens reflex camera including a semi-transparent area and a fully reflective area whereby some of the light entering the camera is reflected into a viewfinder/rangefinder optical system and some of the light also passes through the semi-transparent area onto a photodetector incorporated in the camera metering system, the improvements characterized by the reflex mirror comprising:
   a. a central, elliptical, fully reflective area whose center coincides with the optical axis of the camera, and
   b. a semi-transparent, elliptical area surrounding the central area,
   c. the remaining area of the mirror surrounding the semi-transparent area being fully reflective, whereby the projection of the mirror areas onto a focal plate of the camera forms a plurality of concentric circles, and a circular distance measuring and focusing area in the center of said focal plate is brightly illuminated.

2. A reflex mirror as defined in claim 1, wherein the semi-transparent area is uniformly semi-transparent.

3. A reflex mirror as defined in claim 1, wherein the semi-transparent area is formed by a plurality of concentric elliptical slits in the surface of the mirror.

* * * * *